Sept. 30, 1969  G. S. BERKEBILE  3,469,826
APPARATUS AND METHOD FOR PRODUCING REINFORCED
MOLDING COMPOSITIONS
Filed Oct. 30, 1967  2 Sheets-Sheet 1

Glenn S. Berkebile
INVENTOR.

BY

ATTORNEY

Sept. 30, 1969 G. S. BERKEBILE 3,469,826
APPARATUS AND METHOD FOR PRODUCING REINFORCED
MOLDING COMPOSITIONS
Filed Oct. 30, 1967 2 Sheets-Sheet 2

Glenn S. Berkebile
INVENTOR.

BY *Richard A. Donnelly Jr.*

ATTORNEY

United States Patent Office 3,469,826
Patented Sept. 30, 1969

3,469,826
APPARATUS AND METHOD FOR PRODUCING REINFORCED MOLDING COMPOSITIONS
Glenn S. Berkebile, Evansville, Ind., assignor to Dart Industries Inc., Los Angeles, Calif., a corporation of Delaware
Filed Oct. 30, 1967, Ser. No. 679,025
Int. Cl. F27b 9/28; C21d 9/56
U.S. Cl. 263—3                                    15 Claims

ABSTRACT OF THE DISCLOSURE

Improvements to apparatus having a curing chamber to dry and to fuse resin to fiber glass strands includes partition for dividing curing chamber into 2 longitudinal sections and first and second ducts attached to one of longitudinal sections for uniformly distributing the hot gases to and channeling the gases from the chamber.

BACKGROUND OF THE INVENTION

Field of invention

This invention relates to improvements in the manufacture of reinforced synthetic molding compositions in the form of pellets or granules, each comprising a plurality of generally aligned filaments or threads of glass, or other reinforcing material, impregnated and sheathed by a thermoplastic synthetic resin. More particularly, the invention relates to improvements in the apparatus and method for removing the moisture from the strands and fusing the resin to the strands to produce more uniform fiber glass reinforced injection molding granules.

The prior art

As described in detail in U.S. Patent 3,119,718, it is known to produce such reinforced injection molding compounds by impregnating the continuous fiberglass strand or roving in an emulsion of thermoplastic resin and then passing the resulting impregnated roving through a curing section to remove the water and to fuse the resin to the roving. The coated roving is then cooled and cut into suitable lengths for use in injection molding machines. The prior art apparatus used to cure the roving contains features which result in nonuniformity in the flow of hot gases and in the temperature gradients in the curing section. This nonuniformity results in reduced rates of production of the finished molding composition and in variations in the quality of the finished reinforced molding pellets. The resin in a portion of the pellets did not fuse properly. Another portion was cured at temperatures that were too high resulting in scorched pellets.

In the prior art apparatus, the strands are passed from creel cages through tension equalizing and adjusting sections, an impregnation section, a curing section and feeding and cutting sections. The creel cages are merely designed to hold a number of roving packages in operable positions to permit uninterrupted unwinding of a plurality of continuous strands of the reinforcing material, for example, fiber glass. The tension equalizing and adjusting sections are merely designed to provide sufficient tension on the strands coming into the impregnation section to permit the desired resin pick-up. It is known that light tension on the strands permits the separation of the fiber glass filaments in the resin bath and thus promotes impregnation of the strands. Care must be taken to avoid the accumulation of excess resin on and in the strands that are passed through the impregnation section.

The impregnation section comprises an impregnation trough containing a liquid bath of thermoplastic resin which impregnates and sheaths the strands. Polystyrene emulsified in water in a desired ratio is an example of an emulsion suitable for use in the impregnation trough. A roving coating or impregnating bar having a plurality of annular grooves each adapted to receive one strand of fiber glass roving is disposed within the trough and extends substantially along the length of the trough. A rotating doctor bar is supported above the coating bar and is also provided with a series of annular grooves each of which is adapted to receive one of the resin coated strands. Some degree of control is had over the extent of contact the bar has with the impregnated strands by adjusting the doctor bar. This, in turn, gives some control over the amount of excess resin removed by the doctor bar.

The curing section of the prior art apparatus comprises a vertically extending curing chamber or oven directly above the impregnation trough of liquefied resin. Pulley means are provided for directing the strands upwardly from the impregnation section through the bottom of the oven, through the entire length of the oven and outwardly through the top of the oven to the feeding and cutting sections. The prior art oven contains a blower for withdrawing the gases from an upper section of the oven and recirculating the gases mixed with the products of combustion from a burner within the oven. Baffles are provided on portions of the walls of the oven that are adjacent to the upwardly drawn strands to achieve some degree of control over the temperature gradient in the oven. Another method to achieve some degree of control over the temperature gradient is to maintain the temperature of the inlet gases below that which would cause scorching of the strands. However, this results in a reduction in the rate of production of the finished pellets because the linear velocity of the strands must be kept low if the temperature is low. In spite of these and other attempts to solve the problem, the temperature gradients in the prior art oven are nonuniform. As a result of this nonuniformity, either the strands are overheated or they receive insufficient curing, or both. This in turn results in an excessive loss of product.

The feeding and cutting sections comprise a mechanism for drawing the plurality of continuous strands from the creel cages through the impregnation and curing sections and a pelletizer for cutting the continuous strands into lengths of between about ⅛ to 1 inch, preferably ¼ to ½ inch.

SUMMARY

In contrast to the apparatus of the prior art, the present invention comprises improvements in the apparatus and method for curing the impregnated strands of reinforcing material to obtain a more uniform gas flow and temperature gradient throughout the entire distance of strand travel in the curing section.

An object of the present invention is to provide improved apparatus and method for curing the impregnated reinforcing material.

Another object of the present invention is to provide an apparatus and method whereby more uniform temperature gradients are maintained throughout the entire distance the strands travel through the curing chamber and whereby a more uniform flow of hot gases used to cure the impregnated strands is maintained in the curing section.

A further object of this invention is to improve the prior art curing section to increase the rate of production of the reinforced molding compositions.

The improvements in the apparatus for producing a reinforced molding composition, which make up the novel elements of the apparatus of the present invention comprise:

(a) partition means positioned within the curing section for dividing the curing chamber into at least two separate longitudinal sections, (b) first duct means connected to the first of the longitudinal sections adjacent to one end of said curing chamber for uniformly distributing the hot gases within the first longitudinal section, and (c) second duct means connected adjacent to the other end of the curing section for uniformly channeling the gases from the curing chamber to the burner chamber.

It has been found that this combination of means results in a more controlled flow of hot gases and a more uniform temperature gradient throughout the curing chamber than is achieved by the prior art. By uniform temperature gradient, it is meant an even decrease in the temperature of the gases per unit distance as the strands travel from the point of entry to the exit of the curing chamber. The desired temperature gradient is one in which the temperature of the hot gases in that portion of the curing chamber adjacent to the incoming strands is high, i.e., in the range of about 500° to 800° F. and the temperature of the gases adjacent the exiting strands is low, i.e., in the range of about 250° to 500° F. In the optimum case, the temperature decreases at a constant rate from the inlet to the exit of the strands. However, a stepwise decrease in temperature along the distance of strand travel is sufficient to achieve the desired temperature gradient.

During the initial portion of strand travel, i.e., the drying section, water is being evaporated from the surface of the strands. The temperature of the surface of the strands in the drying section is thereby maintained relatively constant at about 212° F. Thus, the temperature of the hot gases can be maintained relatively high in the drying section to increase the drying rate. However, since the distance traveled by the strands to completely evaporate the water varies depending on many interrelated factors such as the temperature of the hot gases, the type of resin, the water to resin ratio and the rate of strand travel, it is desired that a uniform temperature gradient be established in the drying section. Conversely, during the final portion of strand travel, i.e., the fusing section, the temperature of the surface of the strands is substantially the same as the temperature of the surrounding gases. Thus, in order to prevent scorching of the strands, the temperature of the surrounding gases must be maintained at no higher than 500° F., preferably in the range of about 250° to 400° F. In the fusing section, like in the drying section, a uniform temperature gradient should be maintained because of the same interrelated factors.

The curing section of the apparatus of this invention has a curing chamber positioned adjacent to the impregnation section, a burner chamber adjacent to the curing chamber and wholly exterior to the curing chamber, a burner positioned within the burner chamber, gas-circulating means for withdrawing gases from a portion of one end of the curing chamber and discharging them into a portion of the curing chamber adjacent the other end for their passage longitudinally through the curing chamber after they have been mixed in the burner chamber with the combustion products from the burner, means for controlling gas flow from the upper portion of the curing chamber to the gas-circulating gases means, an outlet in the burner chamber for removing a portion of the circulating gases from the curing chamber, an air-inlet in the burner chamber for supplying the burner with air, and pulley means for directing the impregnated strands in a first pass through an opening in one end of the curing chamber and through an opening in the other end of the curing chamber and in a second pass back through openings in each end of the curing chamber.

The present invention also comprises an improvement in the method for drying the resin impregnated strands and fusing the resin to the strands, comprising:

(a) uniformly distributing the incoming flow of hot gases from the burner chamber into a portion of the curing chamber adjacent to the first end, (b) contacting the strands in their first pass with the incoming flow of hot gases, (c) preventing the incoming flow of hot gases from directly contacting the strands in their second pass with a partition separating the curing chamber into two longitudinal sections, a first longitudinal section for the strands in this second pass, and (d) uniformly withdrawing the gases from a portion of the curing chamber adjacent the second end and returning the gases to the burner chamber.

BRIEF DESCRIPTION OF THE DRAWINGS

The present invention will be more readily understood and further objects and advantages thereof will be more apparent when read in conjunction with the drawings in which.

PREFERRED EMBODIMENT OF THIS INVENTION

Figure 1:
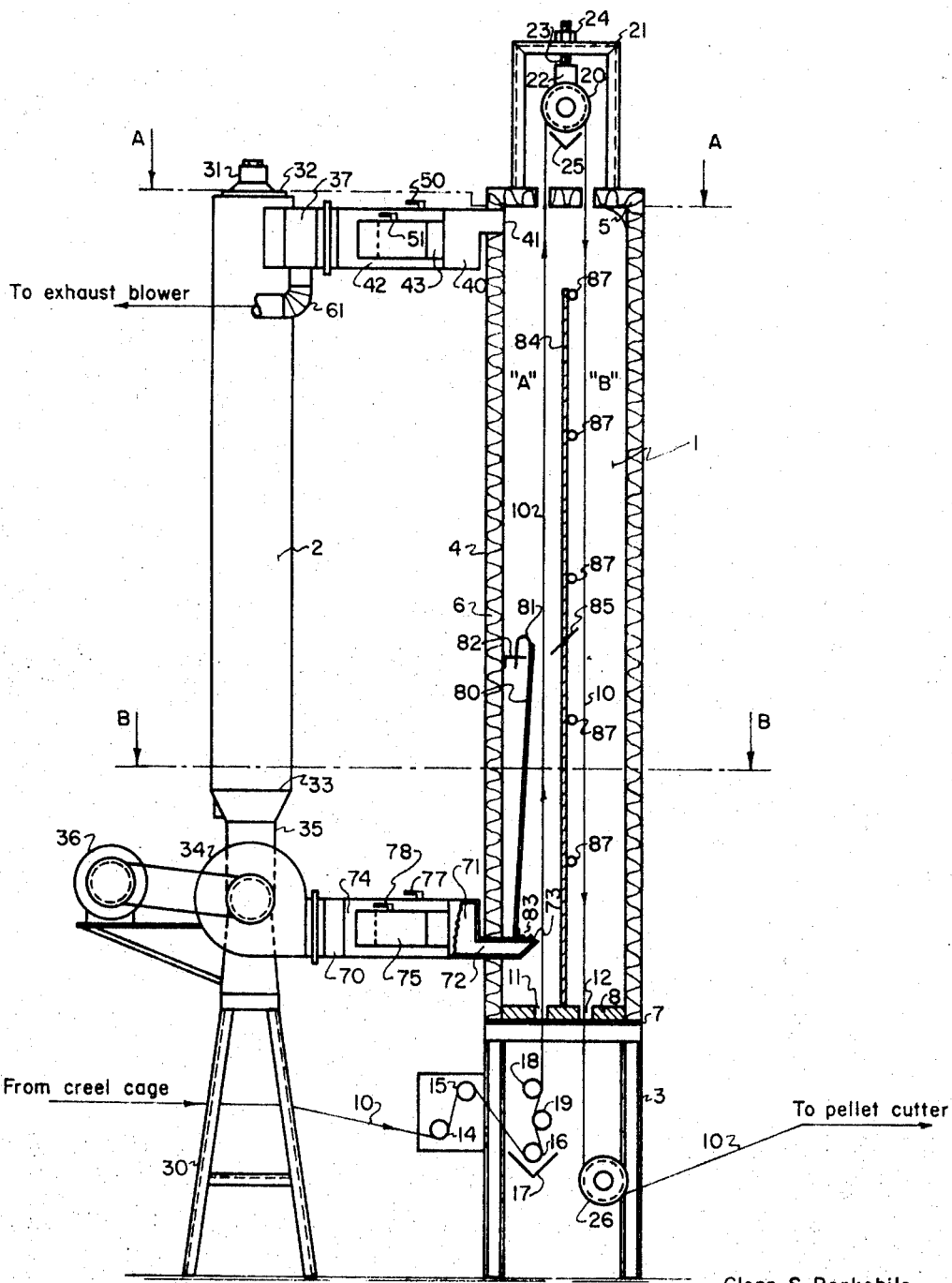
FIG. 1 is a side elevation, partially in cross-section, showing the details of the curing section including curing chamber 1 and burner chamber 2 of the apparatus of the present invention.

Referring now to FIG. 1, curing chamber 1 is an elongated vertical oven mounted on frame 3. The oven comprises walls 4 and top 5 suitably insulated with glass wool 6 and bottom 7 insulated with insulation bricks 8. A plurality of continuous fiber glass strands 10 from the creel cage (not shown) are guided by adjustable guide bars 14 and 15 and impregnation bar 16 through impregnation trough 17. The strands contact rotating doctor bar 18 rotated by any suitable drive means (not shown). Each of bars 14, 15, 16 and 18 is provided with a series of spaced annular grooves (not shown); each groove is adapted to receive a single strand to keep the plurality of incoming strands separated and to prevent tangling. Each of bars 14, 15, 16 and 18 are suitably affixed to frame 3 by means not shown. Tension bar 19 is also mounted on frame 3 by suitable means not shown. Threaded bolts (not shown) at either end of tension bar 19 permit horizontal adjustment of bar 19. The tighter the adjustment bolts, the greater the friction between strands 10 and impregnation bar 16 and doctor bar 18 and the greater the stripping action on the impregnated strands 10 to prevent excess accumulation of resin. Strands 10 pass upwardly through strands 11 in bottom 7 of curing chamber 1 and through an opening in top 5 of curing chamber 1.

The continuous strands 10 are looped around top pulley system 20 fixedly attached to pulley support 21 by means of bracket 22, bolt 23 and nut 24. Deflector 25 is mounted to pulley support 21 by means not shown to act as a heat deflector to prevent the flow of hot gases exhausting through the opening in top 5 from contacting top pulley system 20. Excessive temperatures in this upper section of curing chamber 1 causes strands 10 to stick to the pulleys of pulley system 20. Additional means can be provided to prevent excessive temperatures around pulley system 20. In this embodiment a plurality of fans (not shown) are positioned opposite to pulley system 20. Strands 10 return through another opening in top 5 and pass downwardly through the entire length of curing chamber 1. The strands pass through strands outlet 12 in bottom 7 and over bottom pulley system 26 where strands 10 are drawn to the pellet cutter (not shown).

Top and bottom pulley systems 20 and 26 each comprises a number of pulleys corresponding to the number of individual strands. Each pulley in pulley systems 20 and 26 is mounted to rotate independent of each other pulley. This permits each of strands 10 to travel at different rates through the apparatus of this invention. Drive mechanism (not shown) which draws the continuous strands 10 through the apparatus of this invention comprises any suitable means, for example, as described in U.S. Patent 3,119,718.

Figure 3:
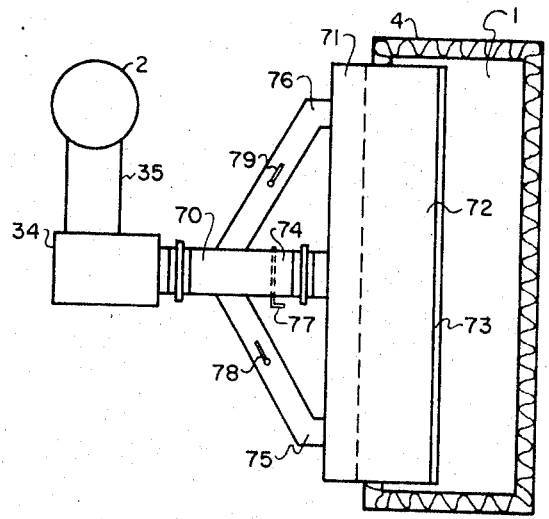
FIG. 3 is a view taken along line B—B of FIG. 1 showing in detail the bottom duct of the gas-circulating means but excluding the internals of curing chamber 1.
Figure 2:
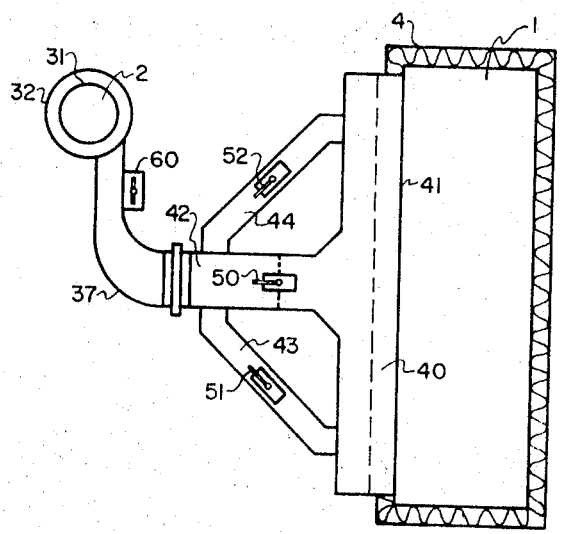
FIG. 2 is a view taken along line A—A of FIG. 1 showing in detail the top duct of the gas-circulating means but excluding the internals of curing chamber 1.

Referring now to FIGS. 1, 2 and 3, burner chamber 2 which is a vertically extending vessel adjacent to curing chamber 1 is supported on support 30. Burner 31 is mounted in top 32 of burner chamber 2. Bottom 33 of burner chamber 2 is connected to the suction side of blower 34 by means of sleeve 35. Blower 34 is driven by means of blower motor 36 or other suitable means. Top duct 37 is positioned between the upper portions of curing chamber 1 and burner chamber 2 to uniformly channel gases from the upper portion of curing chamber 1 and to return the gases to burner chamber 2. Top duct 37 contains plenum chamber 40, one side of which is positioned flush against and extends across the upper portion of one of walls 4 of curing chamber 1. Mouth 41 of plenum chamber 40 opens into curing chamber 1. Main duct 42 and runners 43 and 44 of top duct 37 are mounted on the side of plenum chamber 40 opposite to the side against one of walls 4. Dampers 50, 51 and 52 are supplied on the top of main duct 42 and runners 43 and 44, respectively. Dampers 50, 51 and 52 are used to control the flow rate of the gases passing to burner chamber 2. Dampered air-inlet 60 is mounted on the side of top duct 37 to supply dry air to burner chamber 2. A dampered outlet 61 is provided on the bottom of duct 37 to remove a small gas bleed from burner chamber 2 to exhaust blower (not shown). The purpose of outlet 61 is to remove the humid air that accumulates in the upper portion of the oven.

The gases removed from the upper portion of curing chamber 1 are combined with the products of combustion from burner 31 which uses fuel gas. The resulting hot gases are circulated through burner chamber 2 by means of blower 34. Bottom duct 70 is positioned between the bottom portion of curing chamber 1 and burner chamber 2 to return the hot gases from burner chamber 2 to the curing chamber 1. Bottom duct 70 contains plenum chamber 71 and throat 72 attached to one side of plenum chamber 71 and extends through the lower portion of one of walls 4. Mouth 73 of plenum chamber 71 is disposed in the end of the portion of throat 72 extending through one of walls 4. Main duct 74 and runners 75 and 76 of bottom duct 70 are mounted on the side of plenum chamber 72 opposite to the side attached to throat 72. Dampers 77, 78 and 79 are supplied on the top of main duct 74 and runners 75 and 76, respectively, and are used to control the flow of hot gases circulated to curing chamber 1. The hot gases circulated by blower 34 enter through mouth 73 and throat 72 of plenum chamber 71 and pass into the bottom portion of curing chamber 1.

Mounted immediately above mouth 73 is partial partition 80 to funnel the gases upward from the bottom of curing chamber 1. Partial partition 80 is adjustably mounted to one of walls 4 by means of loop 81 fixedly attached to the upper portion of partition 80 which is inserted in one of the loop receiving openings in hanger 82 fixedly attached to one of walls 4. Any other means can be used to adjustably position partial partition 80 toward and away from the walls 4. An example of other means is a threaded member attached at one end to partial partition 80 in threadable engagement with a threaded opening in the wall of curing chamber and having a head at its other end. The lower end of partial partition 80 is fixedly attached to angle 83 which is attached in turn, to throat 72 of bottom duct 70 immediately adjacent mouth 73. Central partition 84 is positioned between the upwardly and downwardly drawn strands 10 and is fixedly attached to bottom 7 of curing chamber 1. Central partition 84 runs substantially the entire length of curing chamber 1 to divide curing chamber 1 into drying section A and fusing section B. An internal baffle means, i.e., damper 85, is positioned and fixedly attached in an opening in central partition 84 about half-way up its length. Partial partition 80 extends from throat 72 of bottom duct 70 to a point opposite the pivot point of damper 85. By the proper positioning of partial partition 80, one can deflect the hot gases toward the upwardly drawn strands 10 and control the linear velocity of the hot gases as they rise through drying section A. Similarly by suitably positioning damper 85, one can control the velocity of the hot gases entering fusing section B. Thus, one has complete control over the flow of gases and over the temperature gradient throughout curing chamber 1.

A plurality of spaced hooks 87 are fixedly attached to central partition 84 to support curtains of asbestos or similar material to give added insulation between drying section A and fusing section B. For example, the temperature at the strands outlet 12 can be dropped about 125° F. when the temperature in the drying section at mouth 73 is in the range of 650° to 750° F. The provisions for the asbestos curtains in curing chamber 1 are to give greater flexibility in control of the temperature gradient.

Figure 5:
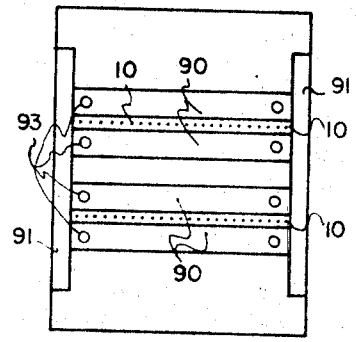
FIG. 5 is a bottom view of curing chamber 1.
Figure 4:
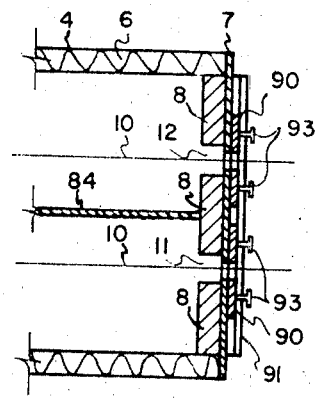
FIG. 4 is a fragmental side elevation of curing chamber 1 showing the details of the lower portion thereof.

Referring now to FIGS. 4 and 5, external baffles 90 are adjustably mounted under bars 91 on bottom 7 of curing chamber 1. External baffles 90 are provided on either side of strands inlet 11 and strands outlet 12 to limit the amount of air aspirating into curing chamber 1. A similar set of baffles and bars are provided on either side of the openings in top 5 of curing chamber 1 to limit hot gases from exhausting from curing chamber 1. Hooks 93 are provided on either end of external baffles 90 to aid in the adjustment of the bars either toward or away from strands 10. The external baffles 90 provide an additional feature for controlling the flow of gases through curing chamber 1 and controlling the temperature gradient over the distance of strand travel.

A specific example indicating the apparatus and the method of the present invention is described below.

Example

About 80 strands of 60 end fiber glass roving lightly sized with an aqueous emulsion of polyvinyl acetate were continuously pulled from separate roving packages in a creel cage. The strands were drawn through the apparatus shown in FIG. 1 and impregnated in an aqueous emulsion of polystyrene. Thirty parts of roving were used for every 70 parts of polystyrene. The impregnated strands were removed from the impregnation pan and passed upwardly and downwardly through the curing chamber. The temperature gradient from the strands inlet, adjacent to the mouth of the bottom duct, to the top of the oven to the strands outlet was about 650° F. to 470° F. to 375° F. At this temperature gradient the temperatures were the highest in the drying section adjacent the mouth of the bottom duct and the lowest in the fusing section. With this temperature gradient the strands were cured at a linear velocity of 28 feet per minute. When the temperature gradient was increased to temperatures at the strands inlet of 750° F., at the top of oven of 570° F. and at the strands outlet of 475° F., the linear velocity was increased to 40 feet per minute.

A similar oven to that of the apparatus of this invention, but without the novel improvements thereof, was operated with the same type of fiber glass roving impregnated with the same type of polystyrene resin. The temperature gradient from the strands inlet to the top of the oven to the strands outlet of this oven was about 540° F. to 500° F. to 540° F. At this temperature gradient, the maximum linear velocity of the strands was only about 9–11 feet per minute.

In the oven without the improvements of the present invention, the temperature gradient in the curing chamber was nonuniform. Lateral temperature probes of the strands inlet and outlet areas indicated differences of about 50° F. and of the top area of the oven indicated differences of about 25° F. This is contrasted to the oven of this invention in which virtually no temperature differences were noted when lateral probes were made of the strands inlet, the strands outlet and the top areas of the oven.

In attempts to increase the linear velocity of the prior art oven, the temperature at the strands inlet was increased to about 1400° F. However, at this temperature the temperature at the strands outlet increased to about 700° F. This resulted in a great loss of product because of scorching of the strands.

Only specific modes of the apparatus and method of the present invention has been described. For example, a detailed description of a vertical curing and burner chamber were given. However, the present invention applies as well to other configurations, including the horizontal oven. Numerous other variations could be made in these modes.

What is claimed is:

1. In an apparatus for producing a reinforced molding composition, an impregnating section to impregnate continuous strands of reinforcing material with a liquid bath of a thermoplastic resin and a curing section to dry the thus impregnated strands and to fuse said resin to said strands of reinforcing material, said curing section having a curing chamber positioned adjacent to said impregnating section and a burner chamber positioned adjacent to said curing chamber for producing a flow of hot gases used in said curing chamber, the improvement in said apparatus for controlling the flow of hot gases and maintaining a more uniform temperature gradient throughout said curing chamber which comprises:
    (a) pulley means for directing the impregnated strands in a double pass through the entire length of said curing chamber,
    (b) partition means longitudinally positioned within said curing chamber for dividing said curing chamber into at least two separate longitudinal sections, said partition means extending longitudinally along substantially the entire length of said curing chamber between the strands,
    (c) first duct means connected to the first of said longitudinal sections adjacent to one end of said curing chamber for uniformly distributing the hot gases within said first longitudinal section, and
    (d) second duct means connected adjacent to the other end of said curing section for uniformly channeling the gases from said curing section to said burner chamber.

2. The apparatus of claim 1 wherein said first duct means comprises a plenum chamber, at least two ducts leading from said burner chamber to said plenum chamber, a throat connected at one end thereof to the side of said plenum chamber, opposite said ducts, said throat extending into said first longitudinal section, and having a mouth at the other end of said throat opening into said first longitudinal section.

3. The apparatus of claim 2 wherein said partition means also comprises a partial partition adjustably positioned within said curing chamber, said partial partition extending longitudingally along a portion of the length thereof, one edge of which being adjacent to the mouth of said first duct means for funneling the hot gases being uniformly distributed in said first longitudinal section to control the linear velocity of said gases as they pass through said first longitudinal section.

4. The apparatus of claim 3 wherein said pulley means directs impregnated strands through an opening in each end of said curing chamber and back through another opening in each end of said curing chamber and wherein external baffle means is adjustably mounted to each end of said curing chamber for controlling the amount of air aspirating into the openings in one end of said curing chamber and the amount of gases exhausting out from the openings in the other end of said curing chamber.

5. In an apparatus for producing a reinforced molding compound, an impregnating section to impregnate continuous strands of reinforcing material with a liquid bath of a thermoplastic resin, said impregnating section having a trough adapted to contain said liquid bath, and a curing section for drying said impregnated strands of reinforcing material and for fusing said resin to said strands, said curing section having a vertically extending curing chamber positioned above said trough, a vertically extending burner chamber adjacent to and wholly external to said curing chamber, a burner positioned within said burner chamber, gas-circulating means for withdrawing gases from the upper portion of said curing chamber and for discharging the hot gases into the lower portion of said curing chamber for upward passage through said curing chamber, said hot gases resulting from an admixture of the gases withdrawn from said upper portion with the combustion products from said burner, means for controlling the flow of gases from said upper portion of said curing chamber to said gas-circulating means, an air-inlet in said burner chamber for supplying said burner with air, and pulley means for directing said impregnated strands upwardly through an opening in the bottom of said curing chamber and through an opening in the top of said curing chamber and downwardly back through another opening in said top and through another opening in said bottom, the improvement in said apparatus for controlling the flow of hot gases and maintaining a more uniform temperature gradient throughout said curing chamber which comprises:
    (a) partition means comprising a central partition vertically positioned within said curing chamber and extending vertically along substantially the entire height of said curing chamber between the upwardly and downwardly directed strands for dividing said curing chamber into a drying section and a fusing section,
    (b) bottom duct means connected to the lower portion of the drying section for uniformly distributing the hot gases within said drying section, and
    (c) top duct means connected to said upper portion of said curing chamber for uniformly channeling the gases from said upper portion to said gas-circulating means.

6. The apparatus of claim 5 wherein said bottom means comprises a plenum chamber, at least two ducts leading from said burner chamber to said plenum chamber, a throat connected on one end thereof to the side of said plenum chamber opposite said ducts, said throat extending into the drying section and having a mouth at the other end of said throat opening upwardly into said drying section.

7. The apparatus of claim 5 wherein internal baffle means is positioned between said upwardly and downwardly directed strands and rotatably mounted within an opening in said central partition for controlling the flow of hot gases from the drying section to the fusing section.

8. The apparatus of claim 7 wherein said partition means also comprises a partial partition adjustably positioned within the lower portion of the drying section, said partial partition extending vertically along a portion of the height thereof, the lower side of which being adjacent to the mouth of said bottom duct means for funneling the hot gases being uniformly distributed in the drying section to control the linear velocity of said gases as they rise through said drying section and the upper side of which being adjacent to said internal baffle means for deflecting a portion of the hot gases into the fusing section.

9. The apparatus of claim 5 wherein external baffle means is adjustably mounted to each end of said curing chamber for controlling the amount of air aspirating into the openings in the bottom and out from the openings in the top of said curing chamber.

10. The apparatus of claim 5 wherein hook means are provided on said central partition for hanging internal insulation between the drying and fusing section.

11. The apparatus of claim 5 wherein said top duct mean comprises a plenum chamber, one side of which being positioned flush against the upper portion of the drying section, at least two ducts leading from said burner chamber to the side of said plenum chamber opposite to the side against said upper portion, an opening in the latter side of said plenum chamber and said upper portion placing said top duct means in fluid communication with said upper portion.

12. In a method for drying continuous strands of reinforcing material impregnated with a liquid bath of thermoplastic resin and fusing the resin to said strands comprising the improvement for controlling the flow of hot gases and maintaining a more uniform temperature gradient throughout a curing chamber comprising directing the impregnated strands in a first pass through an opening in a first end of said curing chamber and through an opening in a second end of said curing chamber and in a second pass back through the second end and through another opening in the first end, producing hot combustion gases in a burner chamber, and mixing the gases removed from the second end of said curing chamber with the hot combustion gases in said curing chamber to produce a flow of hot gases, which comprises:

(a) uniformly distributing the incoming flow of hot gases from the burner chamber into a portion of said curing chamber adjacent the first end,
   (b) contacting the strands in their first pass with said incoming flow of hot gases,
   (c) preventing said incoming flow of hot gases from directly contacting the strands in their second pass with a partition separating the curing chamber into two longitudinal sections, a first longitudinal section for the strands in their first pass and a second longitudinal section for the strands in the second pass, and
   (d) uniformly withdrawing the gases from a portion of said curing chamber adjacent the second end and returning the gases to said burner chamber.

13. The method of claim 12 wherein a controlled amount of the hot gases are passed through a dampered opening in said partition from the first longitudinal section to the second longitudinal section.

14. The method of claim 12 wherein said incoming flow of hot gases being uniformly distributed in said first section are funneled in the portion of said first section adjacent said first end so that the linear velocity of said gases are controlled as they pass through said first longitudinal section.

15. The method of claim 12 wherein the amount of air which aspirates into the openings in the first end of said curing chamber and the amount of gases which exhaust out from the openings in the second end of said curing chamber are controlled.

References Cited

UNITED STATES PATENTS

| 1,200,041 | 10/1916 | Speed | 263—3 |
| 2,087,145 | 7/1937 | Harris | 263—3 |
| 3,183,605 | 5/1965 | Arque et al. | 263—3 X |

JOHN J. CAMBY, Primary Examiner

U.S. Cl. X.R.

266—3